(12) United States Patent
Haaker et al.

(10) Patent No.: US 7,924,289 B2
(45) Date of Patent: *Apr. 12, 2011

(54) METHOD FOR DETERMINING WEIGHTING FACTORS FOR THE COLOR CALCULATION OF A COLOR VALUE OF TEXELS FOR A FOOTPRINT

(75) Inventors: Thomas Haaker, Starnberg (DE); Roland Richter, München (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/690,071

(22) Filed: Mar. 22, 2007

(65) Prior Publication Data

US 2007/0296731 A1 Dec. 27, 2007

Related U.S. Application Data

(63) Continuation of application No. 10/916,983, filed on Aug. 11, 2004, now Pat. No. 7,379,072, which is a continuation of application No. PCT/EP03/10017, filed on Sep. 9, 2003.

(30) Foreign Application Priority Data

Sep. 13, 2002 (DE) .................. 102 42 640

(51) Int. Cl.
*G09G 5/00* (2006.01)

(52) U.S. Cl. ........ 345/582; 345/583; 345/584; 345/586; 345/587; 345/596; 345/597; 345/598; 345/599; 345/611; 382/199; 382/203

(58) Field of Classification Search .................. 345/583, 345/584, 586, 598, 599

See application file for complete search history.

(56) References Cited

U.S. PATENT DOCUMENTS 5,392,385 A 2/1995 Evangelisti et al.
(Continued)

FOREIGN PATENT DOCUMENTS

| CN | 1305612 | 7/2001 |
|---|---|---|
| JP | 9147125 | 6/1997 |
| JP | 11250279 | 9/1999 |
| JP | 2001-052160 | 2/2001 |
| JP | 2001-236523 | 8/2001 |

OTHER PUBLICATIONS

Ewins, Jon P., M. Waller, M. White, and P. Lister; *Implementing an anisotropic texture filter*, 2000; Elsevier Science Ltd.

(Continued)

*Primary Examiner* — Antonio A Caschera

(74) *Attorney, Agent, or Firm* — DLA Piper LLP (US)

(57) ABSTRACT

In a method for determining weighting factors for the color calculation of a color value of texels for a footprint covering a plurality of texels in a texel grid, in a graphic system, form information of the footprint is determined at first. Afterwards, the edges of the footprint are determined and the edges determined in this way are approximated by a staircase function. The texels of the texel grid contacted by the staircase function are determined and a weighting factor is determined for each texel containing a portion of the staircase function, depending on the subarea of the respective texel covered by the footprint.

17 Claims, 14 Drawing Sheets

U.S. PATENT DOCUMENTS

| | | | |
|---|---|---|---|
| 5,651,104 | A | 7/1997 | Cosman |
| 6,097,397 | A | 8/2000 | Lee |
| 6,184,893 | B1 | 2/2001 | Devic et al. |
| 6,191,793 | B1 | 2/2001 | Piazza et al. |
| 6,292,193 | B1 | 9/2001 | Perry et al. |
| 6,509,902 | B1 | 1/2003 | Pfister et al. |
| 6,735,608 | B1 | 5/2004 | Koyanagi et al. |

OTHER PUBLICATIONS

*Survey of Texture Mapping*; Nov. 1986; IEEE.

Fellner, W.; *Computer Grafik*; 1998.

Fournier, A. and E. Fiume; *Constant-Time Filtering with Space-Variant Kernels*; 1988; Computer Graphics.

Shin, Hyun-Chul, J. Lee, and L, Kim; *SPAF: Sub-texel Precision Anisotropic Filtering*.

(A)

(A)

(B)

① step propagation

② enlargement gap (A)

(B)

METHOD FOR DETERMINING WEIGHTING FACTORS FOR THE COLOR CALCULATION OF A COLOR VALUE OF TEXELS FOR A FOOTPRINT

CROSS-REFERENCE TO RELATED APPLICATIONS

This application is a continuation of U.S. patent application Ser. No. 10/916,983, filed Aug. 11, 2004, now U.S. Pat. No. 7,379,072 which is a continuation of co-pending International Application No. PCT/EP03/10017, filed Sep. 9, 2003, which claims priority from German patent application no. 10242640.6, filed Sep. 13, 2002, all of which are incorporated herein in their entirety by this reference thereto.

BACKGROUND OF THE INVENTION

1. Field of the Invention

The present invention generally relates to a method for displaying images or pictures on a raster display system controlled by a computer. In particular, the present invention relates to an anisotropic filtering mechanism and to a corresponding device required to reconstruct, scale or subject, to a perspective projection, stored discrete images which will subsequently be also referred to as textures, with high quality on the raster display. In particular, the present invention relates to a method for determining weighting factors for the color calculation of a color value of texels for a footprint.

2. Description of the Related Art

In the prior art, anisotropic filtering methods, such as, for example, the so-called area sampling, are known to associate a texture to a footprint. In the prior art, so-called weighted area samplings and unweighted area samplings are known, a disadvantage of the methods known from the prior art being that discontinuities in the image illustrated are produced with perceivable artifacts at a transition between a weighted and an unweighted sampling.

A "footprint" is the perspective projection of a picture element (pixel) of an object onto a curved surface. A "footprint" can be a convex four-sided (quadrilateral) illustration representing the approximate result of the perspective projection onto a regular texel grid (texture element grid) of a square picture element (pixel) of an object onto a curved surface.

SUMMARY OF THE INVENTION

Departing from this prior art, it is the object of the present invention to provide an improved method enabling the determination of texels below the edges of the footprint when producing weightings for texels of a footprint in a simple and fast way.

The present invention provides a method for determining weighting factors for the color calculation of a color value of texels for a footprint covering a plurality of texels in a texel grid, in a graphic system, comprising the following steps:
(a) determining form information of the footprint;
(b) determining the edges of the footprint;
(c) approximating the edges determined in step (b) by a staircase function;
(d) determining the texels of the texel grid contacted by the staircase function; and
(e) determining a weighting factor for each texel containing a portion of the staircase function depending on the subarea of the respective texel covered by the footprint.

According to a preferred embodiment, a texel contacted by the staircase function is determined based on the starting points and/or endpoints of the vertical portions of the staircase function.

A uniform weighting factor is preferably associated with texels of the texel grid which are not contacted by the staircase function and which are covered by the footprint, wherein the weighting factors for each texel are associated with a data structure.

According to a further preferred embodiment, the staircase function, for each edge of the footprint, includes a plurality of steps, a plurality of horizontal step elements and a plurality of vertical step elements, wherein each edge includes a plurality of subsequent edge portions of equal lengths, wherein a horizontal edge is present when the end points of the edge portions of the edge intersect a horizontal step element of the staircase function, wherein a vertical edge is present when the end points of the edge portions of the edge intersect a vertical step element of the staircase function, wherein a horizontal edge includes a number of vertical step elements, the number being equal to the number of steps of the staircase function, wherein a vertical edge includes a number of vertical step elements, the number being larger than the number of the steps of the staircase function by an additional vertical step element, and wherein the additional vertical step element is used for calculating the weighting factors of a neighboring edge having the same vertical position.

According to another preferred embodiment, an enlargement offset (shift) is associated with the footprint, wherein after step (a), based on the enlargement offset, the footprint is enlarged by shifting the edges of the footprint to the outside by a distance depending on the enlargement offset, wherein the shifted edge is determined in step (b), wherein the shifted edge is approximated in step (c) by a staircase function, and wherein a weighting factor is determined in step (e) for each texel containing a shifted edge, depending on the subarea of the respective texel covered by the enlarged footprint.

The footprint is enlarged by shifting in a horizontal direction and in a vertical direction the edge end points by a distance determined by the enlargement offset. Preferably, the gaps resulting are filled by horizontal and vertical edges, wherein further weighting factors are subsequently determined for each texel containing an incorporated vertical edge.

The inventive method provides a novel approach for an anisotropic filtering which makes it, for example, possible to apply the known filtering technique of the area sampling to four-sided footprints which represent a perspectively projected square picture element, which are superimposed on a regular texel grid. More precisely, another input parameter, the so-called enlargement offset, is used according to the invention to control aliasing artifacts. The enlargement offset determines whether a weighted area sampling or an unweighted area sampling is to be applied to the area of the footprint, wherein it is, in particular by this, determined how big the weighting contribution or the degree of weighting for the area sampling is supposed to be. The present invention is preferably applied to deformed footprints, such as, for example, small and long footprints.

A typical characteristic and an essential feature of the present invention is that there is no hardware-based switch, on the basis of a threshold value, which determines when a weighted or an unweighted area sampling is to be performed, which would really result in discontinuities with perceivable artifacts. Instead, the magnitude of the weighted area sampling is preferably increased more and more. Preferably, the growing increase of the weighting contribution takes place with a decreasing footprint, in particular, while the footprint becomes smaller than the width or height extension of a texel.

According to a further aspect of the present invention, a method for determining a weighting factor for the color calculation of a color value of a texel for a footprint extending at least partially into the texel, in a graphic system is provided, in which form information of the footprint is determined and, based on an enlargement offset, the footprint is enlarged by shifting the edges of it to the outside by a distance depending on the enlargement offset, so that it covers several texels. Then, a weighting factor is determined for each texel containing a shifted edge, depending on the subarea of the respective texel covered by the enlarged footprint.

According to this aspect of the present invention, it is made possible for footprints only covering a small number of texels or even only one texel to put the color determination on a broader base by also taking information of neighboring texels into account due to the enlargement of the footprint. It is to be noted that the enlargement only takes place for determining the color value—the footprint is not enlarged for the later illustration of the object it is associated with.

Preferred developments of the present application are defined in the subclaims.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
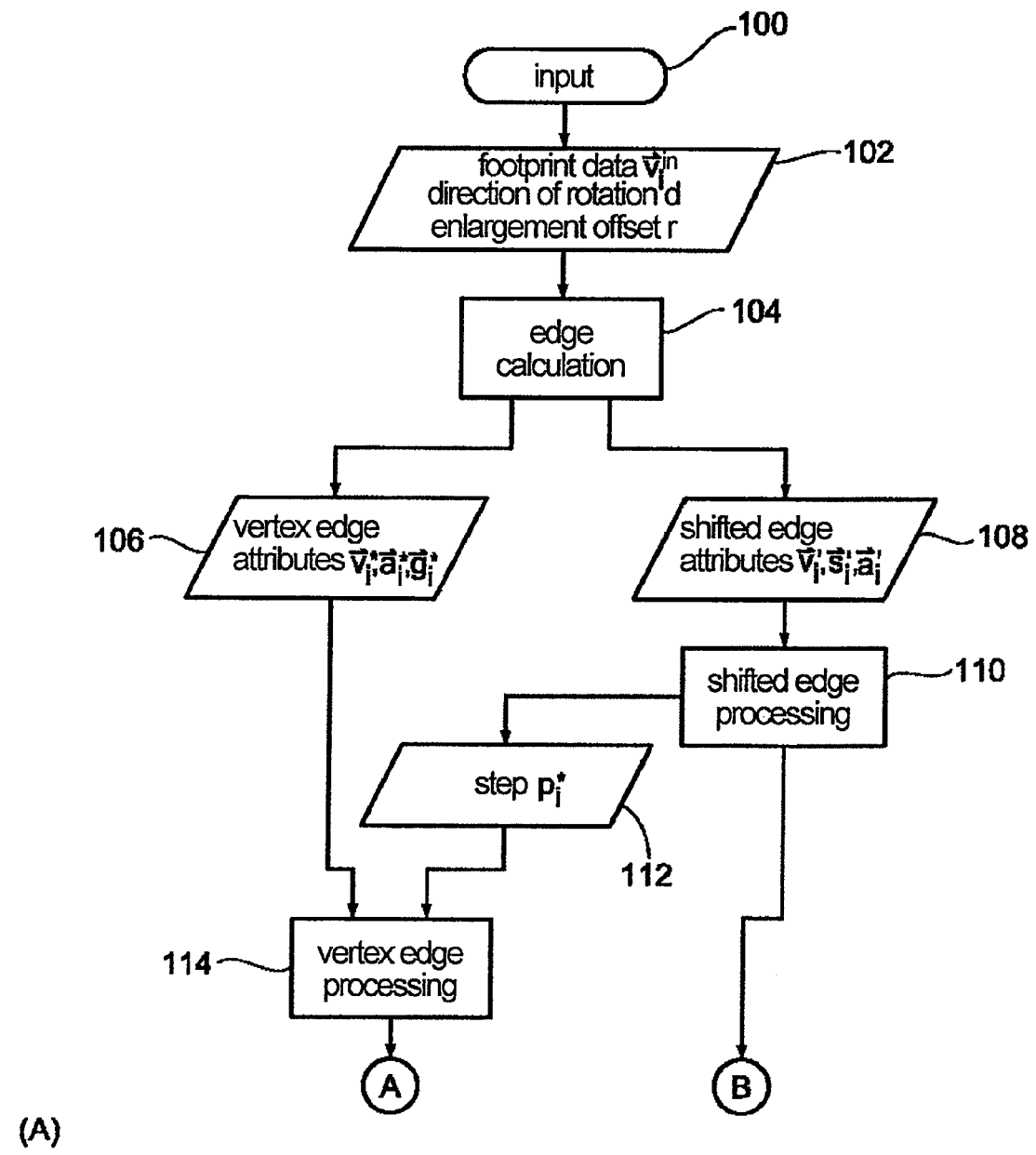
FIGS. 1A and B show a flow chart of a preferred embodiment of the inventive method.
Figure 1:
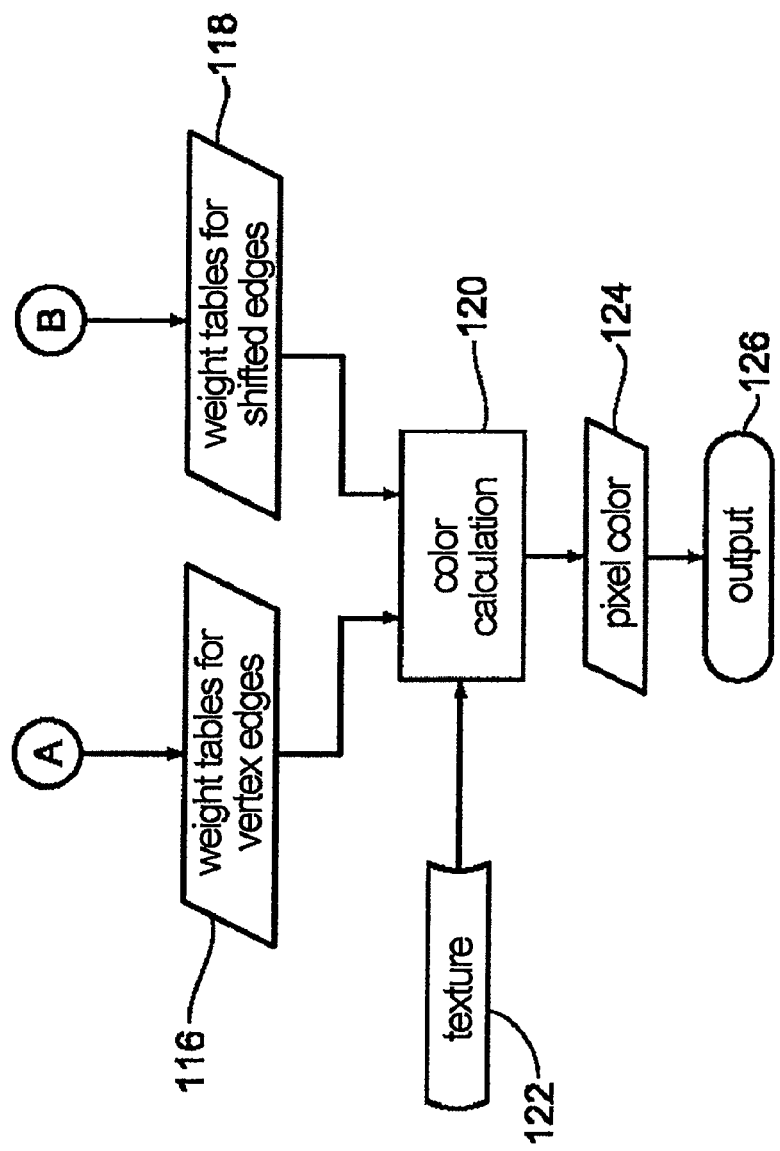

A first embodiment of the present invention will be detailed subsequently referring to FIG. 1, wherein individual process steps will be explained in greater detail in the subsequent description.

Regarding the more detailed description, it is to be noted that the mathematical notation of vectors is used for the description of the footprint (illustrated in the text by BOLD PRINT). The unit length of all the coordinates and lengths is the width (or height, respectively) of a texel in the original texture or in the texture according to a MipMap step, if present. Edge attributes and vertex attributes include the index i running from 0 to 3 and all the results of index calculations exceeding i=0 and i=3, respectively, are calculated back to the actual edges. This means that a result of i=4 becomes i=0 and a result i=−1 becomes i=3.

According to a preferred embodiment, the inventive method, in block 100, receives input data or information representing the form, position and orientation of the four-sided footprint, which is ready in block 102. More precisely, the footprint data $v_i^m$, the direction of rotation d of the footprint and the enlargement offset r are provided in block 102. By receiving the additional input parameter, that is the enlargement offset r, it is made possible according to the invention to determine the degree of the weighted area sampling required for small or thin footprints, in particular small or thin four-sided footprints.

In block 104, a so-called edge calculation takes place. This edge calculation includes enlarging the footprint by offsetting the edges of it based on the form information received and the enlarging parameter r. In the edge calculation 104, vertical edges are subsequently incorporated into the gaps resulting due to the enlargement, a limitation rectangle is calculated and all the edges are sorted into left and right edges in block 104, so that the attribute for the enlarged vertex edges are provided in block 106 and the attributes associated with the offset edges are provided in block 108. More precisely, the footprint information $v_i^*$, the orientation of the individual edges $a_i^*$ and the resulting gaps $g_i^*$ for the enlarged footprint are provided in block 106. In block 108, the vertex information $v_i'$, an orientation of the offset edge $a_i'$ and corresponding edge vectors $s_i'$ are provided. The information provided in block 108 is fed to block 110 in which processing regarding the offset edge is performed. On the other hand, in block 110, a step propagation $p_i^*$ provided in block 112 is calculated. The parameters provided in block 106 and in block 112 are fed to block 114 in which the vertex edge is processed.

The weighting tables for the vertex edges and the offset edges provided in blocks 116 and 118 (FIG. 1B) result from processing the vertex edge (block 114) and the offset edge (110).

Based on the tables produced in this way, there is a color calculation in block 120, wherein block 120 additionally receives information on the texture from block 122. The color calculation in block 122 then yields the pixel color provided in block 124 and output in block 126.

If no enlargement is required or provided for the footprint, there will be no offset of the edges of the footprint. Then the inventive method will only be executed on the original edges. There are no additionally inserted edges in this case or else they are set to zero for calculating.

A suitable data structure for each of the edges of the footprint is created in blocks 110 to 118. Thus the subsequently explained steps are performed in parallel for each edge. At first, an edge is approximated by a suitable number of simple steps and all the texels contacted by a staircase function of a left edge are searched. With each texel found a weighting value corresponding to the fraction of the remaining texel area to the right of the staircase function is associated. In analogy, all the texels below the structure to be illustrated and contacted by the staircase function of a right edge are searched. With the texels found in this way a respective weighting factor corresponding to the fraction of the remaining area of each texel to the left of the staircase function is associated. Subsequently, all the coordinates and corresponding weightings are stored in a suitable unique data structure associated with the edge of the footprint. In addition, a weighting value of ≦+1 or ≧−1, respectively, is associated with all the texels, that is texels to the right of a left edge or a right edge, respectively—however not contacted by it—and to the left of the right edge of the limiting rectangle. This information is added to the data structure.

Preferably the data structures produced in this way according to a preferred embodiment of the present invention are assessed in an efficient way so that each texel covered by the footprint can be addressed directly by the coordinates stored so that subsequently its corresponding color can be multiplied (weighted) by its associated weight. It is to be pointed out that each weighting factor is the sum of the weightings of those edges contained in the texel considered.

In block 120 in FIG. 1B, a color calculation is performed as is known in the prior art. For this color calculation, all the weighting factors are collected and all the weighted texels used by the footprint are also collected and subsequently the collected color is divided by the collected weighting factors. The result represents the picture fragment filtered and retrieved from the texture image, which is associated with the pixel which was intended to be imaged or projected onto the texture image.

Regarding the values $v_i'$, $a_i'$ and $s_i'$ and $v_i^*$, $a_i^*$, $g_i^*$, respectively, quoted in FIG. 1, it is to be pointed out that the values with apostrophe refer to the offset edges, while the values with asterisks refer to the vertex edges.

It is an advantageous of the present invention that the inventive method inherently provides the possibility to use a high degree of parallelism when embodied in an actual hardware implementation. In addition, the inventive method allows its implementation in a hardware pipeline so that, according to a preferred embodiment of the present invention the process steps described above are realized in hardware in different pipeline stages. Preferably, those process steps having been described above and producing the data structure for each edge are typically implemented as a hardware module and are instantiated (called) in parallel for each edge. These modules instantiated in parallel themselves represent a pipeline stage of the entire hardware pipeline.

The fundamental process for retrieving the pixel color from a texel array covered by a four-sided footprint is to perform an unweighted area sampling regarding this footprint. This means that the color components of the texel are at first integrated over the footprint and that the result is subsequently divided by the summed area of the footprint. The calculation of the integral requires a previous multiplication of each texel by a suitable weighting factor. The weighting factor is 1.0 for those texels arranged completely below the footprint. According to the invention, each texel only covered partly by the footprint, i.e. is arranged at the edge of the footprint, is associated a weighting factor proportional to the size of the area covered.

Thus the inventive method fulfills the following two tasks having been described herein before, that is the identification of all the texels covered fully or partly by the four-sided footprint and the calculation of a weight for each texel and the association of this weighting factor to the corresponding texel.

In addition, fading is realized according to the invention, which is controlled by the additional parameter, the enlargement parameter r, to perform fading from an unweighted into a weighted area sampling.

The background of the aspect just described is that an unweighted area sampling in the picture retrieved produces perceivable aliasing artifacts when the footprint is strongly deformed, for example has forms only including very thin and very long areas. This is also the case when the area covered by the footprint becomes considerably smaller than the area of a square texel of the texel grid.

In order to avoid the artifacts just mentioned in these cases, the area of the footprint is extended according to the invention by offsetting the four edges representing the boundary of the footprint. In the cases described above, this approximates a footprint which can be interpreted as the projection of a filter kernel fulfilling the characteristic of a weighted area sampling, wherein the filter kernel overlaps its neighbors and has a bilinear similar distribution.

In the description of the preferred embodiment of the present invention according to FIG. 1 described above it is to be noted that the inventive method basically includes blocks 100 to 118 which provide the data required for a basically conventional color calculation. In addition, it is to be noted regarding FIG. 1 that all the rectangular blocks represent the main process steps described in greater detail subsequently for preferred embodiments of the present invention. The results of the process steps are stored in data structures represented in FIG. 1 in the parallelogram-shaped blocks. These results are used as inputs for the next process steps.

The data input in FIG. 1 in block 100 and the data provided in block 102 include the information regarding the footprint $v_i^{in}$ which, according to a preferred embodiment, is convex and in which the height and the width of none of the edges are allowed to exceed a predetermined maximum value $E_{max}$. In addition, a direction of rotation d for the footprint is input, wherein d=+1 stands for a clockwise direction of rotation and d=−1 for a counter-clockwise direction of rotation. d is set to 0 when the rotation can no longer be determined due to the deformation of the footprint. In addition, the enlargement offset r is input, which is preferably limited to a value between 0.0 and 0.5.

The maximum edge length $E_{max}$ mentioned above is preferably a hardware-coded value which is supposed to be a power of 2, wherein the value 8 is preferred here. Higher values will slow down the raster process, that is the processing speed of the graphic system, significantly and increase the data structures required considerably. If no power of 2 was used, the calculations in connection with $E_{max}$ could only be realized in hardware with a great deal of expenditure.

Figure 2:
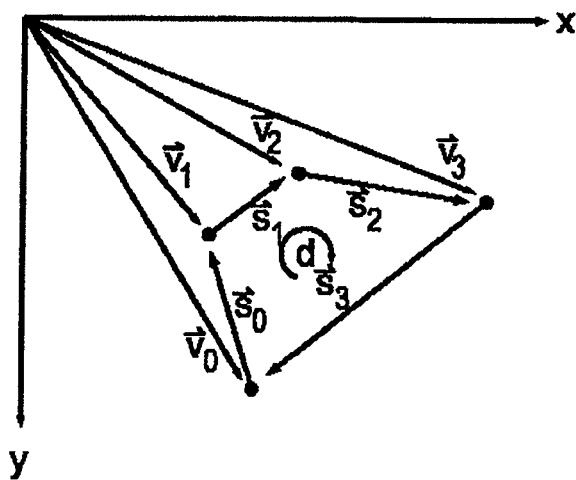
FIG. 2 is the representation of a footprint in the texture space.

FIG. 2 shows an example for a representation of a footprint in the texture space. The texture space in the example illustrated is spanned by the coordinates x and y. The footprint is defined by the four vertex vectors $v_0$ to $v_3$ and the four edge vectors $s_0$ to $s_3$. In addition, the direction of rotation d of the footprint is determined by the direction of the edge vectors $s_0$ to $s_3$. FIG. 2 shows the typical form of a footprint in the texture space. The footprint is defined by its enclosure which in turn consists of the four edges $s_0$ to $s_3$, and is thus often referred to as a four-sided element. The four vertices $v_0$ to $v_3$ positioned in the texture space by the four vectors shown in FIG. 2 define the edges $s_0$ to $s_3$.

As will be described in greater detail subsequently, a main aspect of the present invention is that horizontal and vertical step functions are applied to approximate each of the edges. In order to, however, obtain a consistent and unique weighting algorithm which can be processed in parallel for all the edges $s_0$ to $s_3$, it is assumed for the further calculation that the edges only provide contributions to those texels arranged to the right of an edge. Thus values from left-hand side edges are added to the effective weighting factor resulting for all the edges and values from the right-hand side edges are subtracted from the effective weighting factor resulting from all the edges. The edge attributes left, right, bottom and top are illustrated in FIG. 3.

Figure 3:
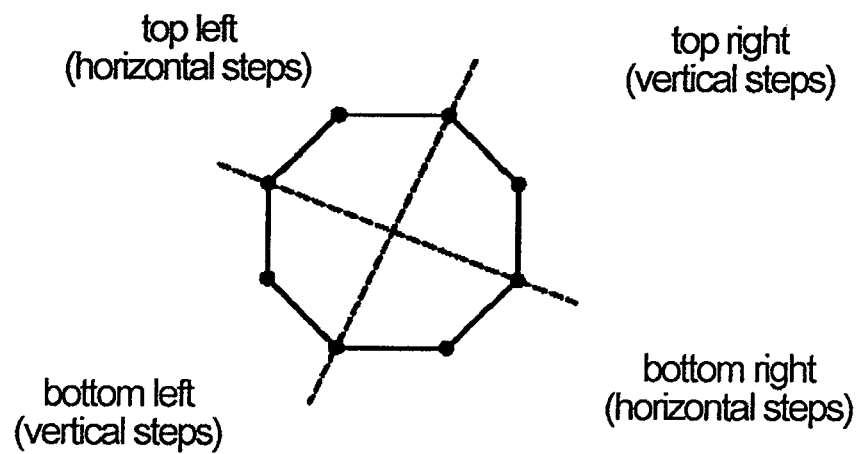
FIG. 3 is a representation for determining the edge orientation of a footprint.

As can be seen from FIG. 3, edges having been classified as bottom left or top right, respectively, are approximated by vertical step elements, while edges classified as bottom right or top left, respectively, are approximated by horizontal step elements. The horizontal and vertical steps just described will be explained in greater detail subsequently.

Figure 4:
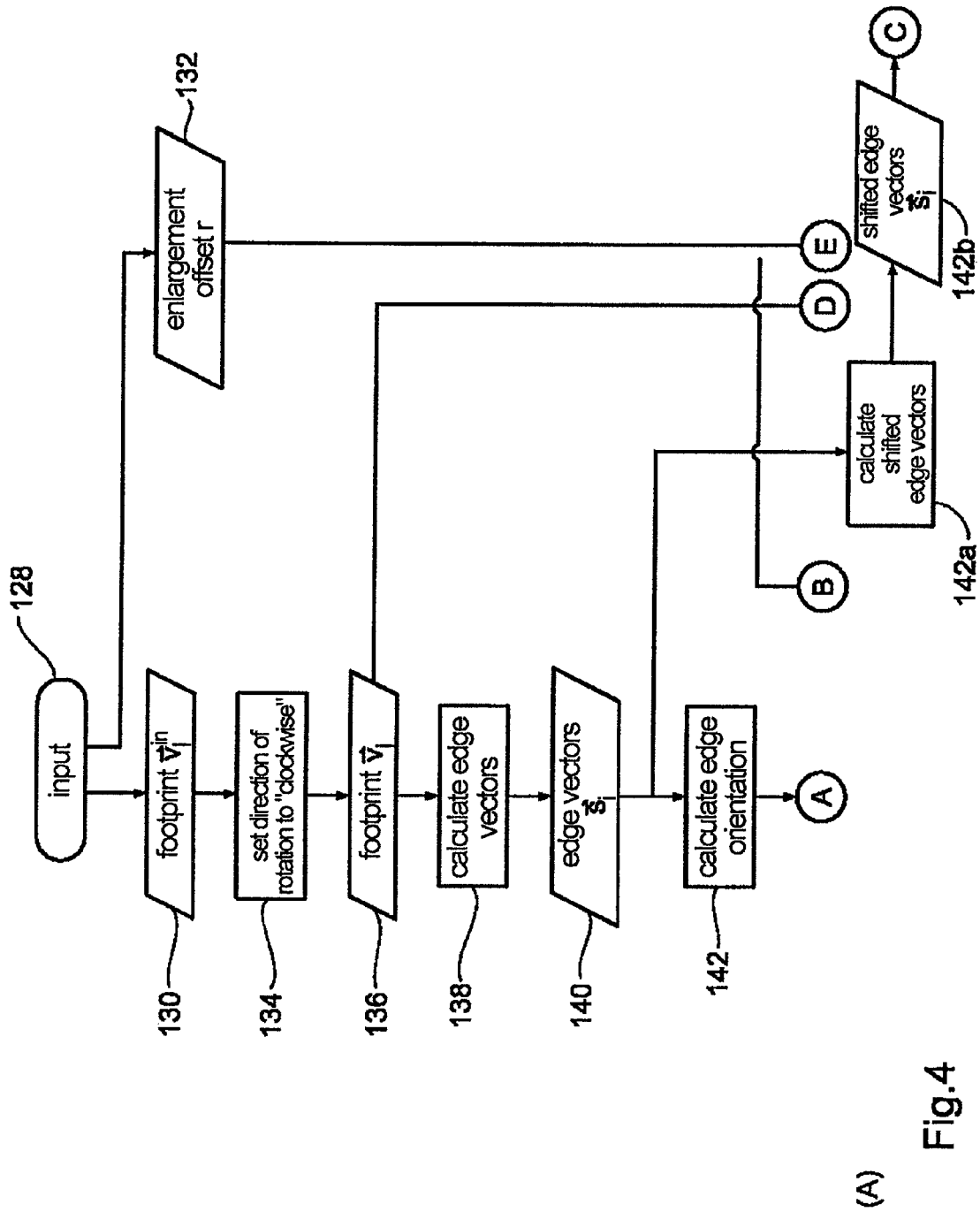
FIGS. 4A and B show a flow chart representing a method for calculating edges according to an embodiment of the present invention.
Figure 4:
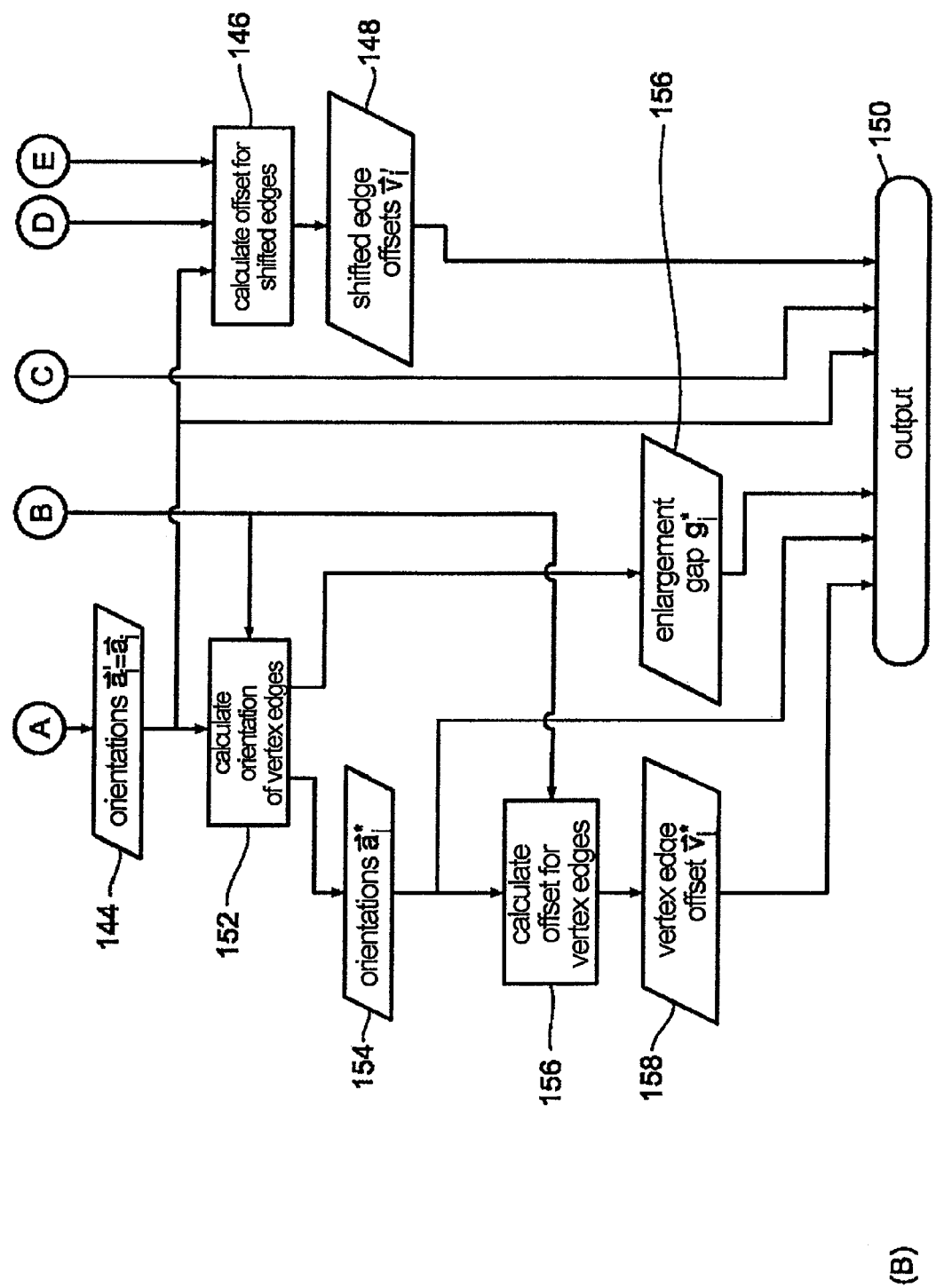

At first, a first main processing step of the inventive method according to a preferred embodiment will be detailed referring to FIG. 4, that is the edge calculation generally indicated in FIG. 1A in block 104. In block 128, the method for calculating the edges receives the data required for this, that is the footprint data $v_i^{in}$ and the enlargement offset r provided in blocks 130 and 132 of the further processing. The edge calculation produces the approximated area of the footprint, wherein a positive filter enlargement, indicated by the enlargement offset r, with $r \geq 0$, is included. Each edge of the original footprint is moved away from the center by adding an offset having a size r. These edges will be referred to as offset edges. As a result of this "explosion", there are horizontal and vertical gaps between the original vertices of the footprint. Horizontal gaps can be ignored in the inventive method according to the embodiment described, vertical gaps, however, are simply filled by vertical edges, the so-called vertex edges.

To simplify the calculation of the edge and vertex attributes and make them less complicated as regards the hardware implementation required, footprints having a counter-clockwise direction of rotation in block 134 are always converted in footprints having a direction of rotation in the clockwise direction (see FIG. 2). The conversion takes place according to the subsequently indicated calculating rule:

$$\overline{v}_{0,1,2,3} = \begin{cases} \overline{v}_{0,1,2,3}^{in} & \text{if } d \geq 0 \\ \overline{v}_{2,1,0,3}^{in} & \text{if } d < 0 \end{cases}$$

$v_{0,1,2,3}^{in}$=input data received in block 128.

The footprint data $v_{0,1,2,3}$ received according to the above calculating rule is provided in block 136 for further processing.

Based on the footprint information $v_i$ provided in block 136, the edge vectors result according to the subsequent calculating rule:

$$\overline{s}_i = \overline{v}_{i+1} - \overline{v}_i$$

In addition, the so-called orientation vectors $a_i$ for the edges are calculated to classify the corresponding edges in left/right and top/bottom edges. Based on the classification shown in FIG. 3, it is determined for each edge in which square it is. In the following table, the values for the two components of the edge orientating vector $a_i$, that is for the components $a_{i,x}$ and $a_{i,y}$, are indicated for different signs of the components $s_{i,x}$ and $s_{i,y}$ of the edge vector $s_i$.

| sign ($s_{i,x}$) | sign ($s_{i,y}$) | $a_{i,x}$ | $a_{i,y}$ |
|---|---|---|---|
| $\geq 0$ | $< 0$ | $-1$ | $-1$ |
| $> 0$ | $\geq 0$ | $+1$ | $-1$ |
| $\leq 0$ | $> 0$ | $+1$ | $+1$ |
| $< 0$ | $\leq 0$ | $-1$ | $+1$ |
| $= 0$ | $= 0$ | $0$ | $0$ |

In the above table, a value of +1 shows an orientation to the right along the x-axis and to the bottom in the direction of the y-axis in the texture space spanned in FIG. 3. A value of −1 shows an orientation to the left in the direction of the x-axis and an orientation to the top in the direction of the y-axis. Horizontal edges and vertical edges are associated the values just mentioned. A "0 edge" (edge deformed in one point) results in a vector a=0 and in a value for a=0.

Figure 5:
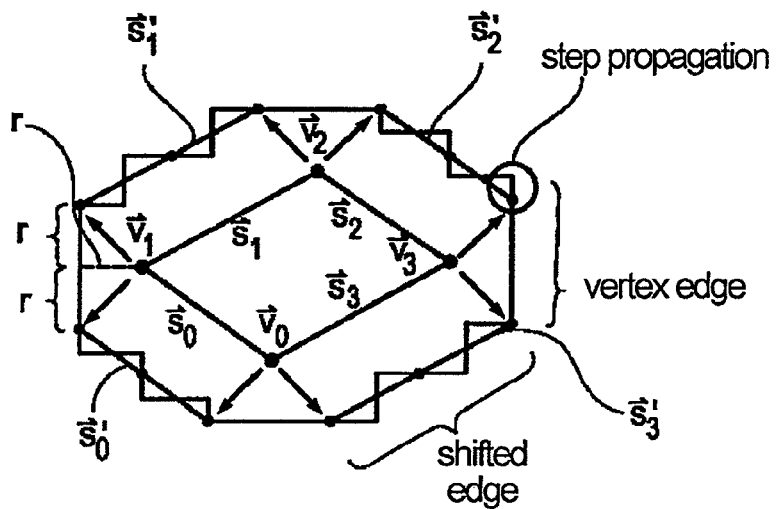
FIGS. 5A and B are two examples for a filter enlargement of a footprint.
Figure 5:
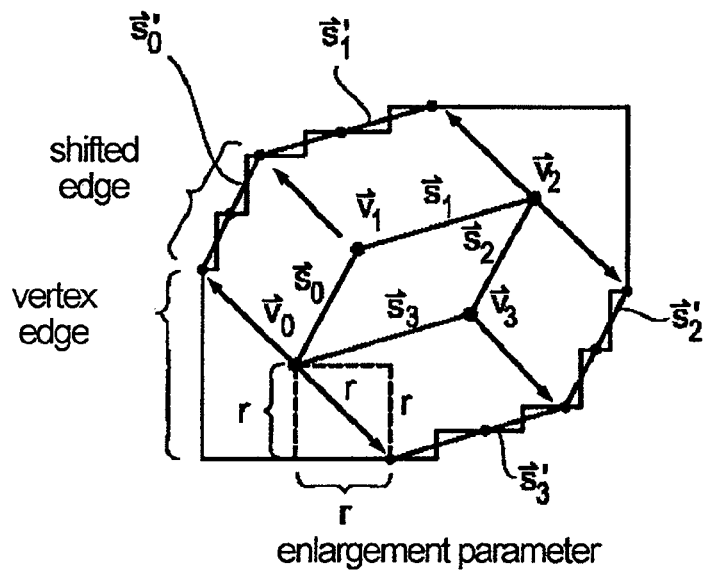

The orientations indicated in the table are used to determine the direction of an enlargement offset. The footprint is extended on four shifted edges $v_i'$, $s_i'$ depending on the size of the limited enlargement parameter r. In reality, each of the original vertices is offset by the enlargement parameter r in the way described and indicated in FIGS. 5A and 5B, whereby the offset edges $s_i'$ result. Because all the edges should be sampled from the left to the right, the starting point and the end point for those edges determined to be bottom have to be exchanged which is performed according to the calculating rule indicated subsequently:

$$\overline{a}_i' = (a'')_i$$

$$\overline{s}_i' = -a_{i,y} \cdot \overline{s}_i$$

$$\overline{v}_i' = r \cdot \overline{a}_i + \begin{cases} \overline{v}_i & \text{if } a_{i,y} < 0 \\ \overline{v}_{i+1} & \text{else} \end{cases}$$

The calculations just described take place in FIG. 4A, on the one hand, in block 138, from which the edge vectors $s_i'$ provided in block 140 result. Based on this information, the offset edge vectors $s_i'$ are calculated in block 142a and provided in block 142b for being output in block 150. Based on this information, the orientation of the edges is calculated in block 142 and subsequently provided for further processing in block 144 (FIG. 4B). In block 146, based on the orientations $a_i'$ provided in block 144, based on the footprint data $v_i$ provided in block 136 and based on the enlargement parameter r provided in block 132, the offset for the offset edges is calculated so that the offset edge information $v_i'$ is provided in block 148 and output in block 150.

Gaps resulting due to the offset of each vertex of the footprint are handled by the vertical vertex edges. The offset of these edges depends on the orientation of the two neighboring edges having a length of larger than 0. These edges are indicated by $j^\pm$, depending on the vertex index i, according to the calculating rule indicated subsequently:

$$j^+(i) = \begin{cases} i+2 & \text{if } a_i' = a_{i+1}' = 0 \\ i+1 & \text{if } a_i' = 0 \\ i & \text{else} \end{cases}$$

$$j^-(i) = \begin{cases} i-3 & \text{if } a_{i-1}' = a_{i-2}' = 0 \\ i-2 & \text{if } a_{i-1}' = 0 \\ i-1 & \text{else} \end{cases}$$

The modified orientation vector $a_i^*$ and the gap flag $\vartheta_i^*$ results as follows using this index translation:

| $a'_{j^-}(i), x$ | $a'_{j^-}(i), y$ | $a'_{j^+}(i), x$ | $a'_{j^+}(i), y$ | $a_{i,x}^*$ | $a_{i,y}^*$ | $\theta_i^*$ |
|---|---|---|---|---|---|---|
| $<0$ | $<0$ | $<0$ | $<0$ | $-1$ | $-1$ | $0$ |
| $<0$ | $<0$ | $>0$ | $<0$ | x | x | $0$ |
| $<0$ | $<0$ | $>0$ | $>0$ | $+1$ | $+1$ | $1$ |
| $>0$ | $<0$ | $>0$ | $<0$ | $+1$ | $-1$ | $0$ |
| $>0$ | $<0$ | $<0$ | $>0$ | $+1$ | $-1$ | $1$ |

-continued

| a'$_{j-}$(i), x | a'$_{j-}$(i), y | a'$_{j+}$(i), x | a'$_{j+}$(i), y | a$_{i,x}$* | a$_{i,y}$* | θ$_i$* |
|---|---|---|---|---|---|---|
| >0 | <0 | >0 | >0 | +1 | −1 | 1 |
| <0 | >0 | <0 | <0 | −1 | +1 | 1 |
| <0 | >0 | >0 | <0 | −1 | +1 | 1 |
| <0 | >0 | <0 | >0 | −1 | +1 | 0 |
| >0 | >0 | <0 | <0 | −1 | −1 | 1 |
| >0 | >0 | <0 | >0 | x | x | 0 |
| >0 | >0 | >0 | >0 | +1 | +1 | 0 |
| else | | | | x | x | x |

X stands for a value not having effects on following calculations which can thus have any value. The basic point for the vertex edge and the size of the enlargement gap then results according to the calculating rule indicated subsequently:

$$\overline{v}_i^* = \overline{v}_i + r \cdot \overline{a}_i^*$$

$$g_i^* = \begin{cases} 0 & \text{if } a_i = 0 \\ \vartheta_i^* \cdot 2r & \text{else} \end{cases}$$

The condition $a_i=0$, from which $g_i^*=0$ results, ensures that a "0 edge" having two neighboring and also identical vertices having the same attributes only produces a gap edge for the subsequent texel weighting. The calculating steps described above at first take place in block 152 in which, based on the orientation $a_i'$ provided in block 144 and based on the enlargement parameter r, an orientation of the vertex edges is calculated, which is then provided in block 154. In addition, the enlargement gap $g_i^*$ is provided in block 156, which has also been produced by the calculation of block 152.

Based on the orientations $a_i^*$ provided in block 154 the offset for the vertex edges $v_i^*$ then provided in block 158 is calculated in block 156. In block 150, the offset vertex edges $v_i^*$, the orientations $a_i^*$, the enlargement gap $g^*$, the orientation $a_i'$ provided in block 144, the offset edge vectors $s_i'$ and the offset vertex information $v_i'$ are output, as is indicated in FIG. 1A in blocks 106 and 108.

Based on the attributes $v_i'$, $s_i'$ and $a_i'$ output, the processing of the offset edges, which is indicated in FIG. 1A in block 110, takes place subsequently in a second main processing step. For the processing of the offset edges, they are approximated by a number of steps, the number of steps depending on the size of the offset edge. It is to be pointed out at this point that 0 edges having a value $a_i=0$ are omitted. In addition, the width and the height of a step should not exceed a value of 1.0. At first, the number of steps $n_{step}$ per edge must be determined. This takes place according to the following calculating rule:

$$s_{max} = \max(|s'_{i,x}|, |s'_{i,y}|)$$

1) $n_{i,Stufe} = \lceil s_{max} \rceil$

2) $n_{i,Stufe} = 2^{\lceil \log_2(s_{max}) \rceil}$

The calculating method indicated by 2) is preferred since it can be simplified significantly by the hard-coded maximum value for the edge lengths $E_{max}$ and also substitutes complicated devisors by simple offset operations in the subsequent calculation of the step vectors $q_i$. The step vectors $q_i$ are calculated according to the calculating rule indicated subsequently:

$$\overline{q}_i = \frac{1}{n_{i,step}} \cdot \overline{s}_i'$$

Figure 6:
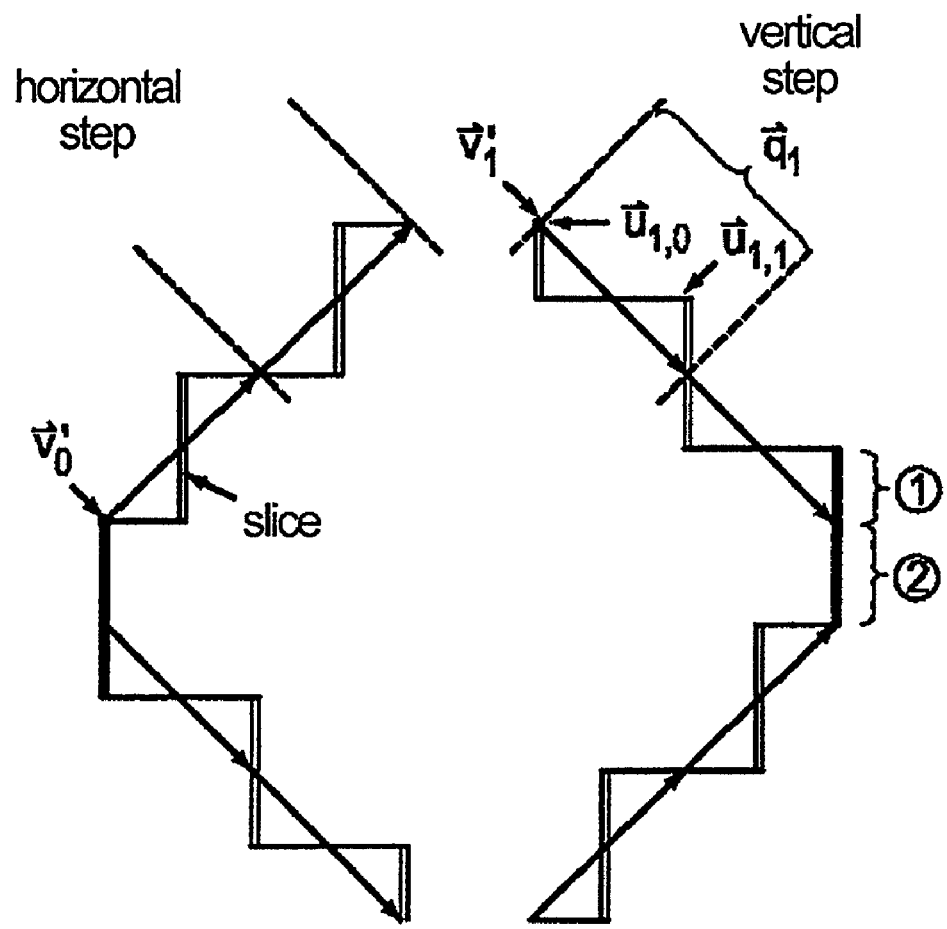
FIG. 6 is a representation of the approximation of edges of the footprint by a staircase function.

In order to obtain the same weighting methods with all the vertices, two different step methods are required. The step requirement $\vartheta_i'$ is 0, that is horizontal, for the edges at the top right and the edges at the bottom left. The step orientation $\vartheta_i'$ is 1, that is vertical, for the steps at the top left and for the steps at the bottom right. Horizontal steps refer to horizontal intersections of a staircase function with the corresponding edge at the end of the step vector $q_i$. The vertical steps relate to vertical intersections of the staircase function with the respective edge at the end of the step vector $q_i$, as can be seen from FIG. 6. A slice is a vertical step element used to determine the weightings of the texels. The following calculating rule applies to the step orientation $\vartheta_i'$:

$$\vartheta_i' = \begin{cases} 1 & \text{if } ((a_{i,x} < 0) \text{ and } (a_{i,y} > 0)) \text{ or } ((a_{i,x} > 0) \text{ and } (a_{i,y} < 0)) \\ 0 & \text{else} \end{cases}$$

Since the edges having a step orientation $\vartheta_i'$ equaling 1 have one vertical element more than the number of steps $n_{i,step}$, an additional weighting cycle would be required. Instead, it can be offset to the processing of a neighboring vertex edge of the same x position, which, in connection with the present invention, is referred to as step propagation and will be detailed subsequently referring to FIG. 9.

A slice processing loop is provided for each edge and processes one slice per cycle, as will be detailed subsequently referring to FIG. 8. Each cycle can weight one or two texels, wherein the input parameters for the processing loop are v', q, $n_{step}$, $a'_y$, and $\vartheta'$. The loop produces a data structure and fills it with corresponding data illustrated in the following table:

| | |
|---|---|
| y'$_{ofs}$ | y is the integer coordinate of a texel row k = 0. This is the top-most row for edges for which θ' = 1 and in all other cases the bottom-most row. |
| y'$_{num}$ | number of texel rows |
| x'$_{ofs}$[k] | x is the integer coordinate of the left-most weighted texel in this row |
| x'$_{num}$[k] | number of weighted texels in this row |
| w'$_{ofs}$[k] | weighting index 1 for the left-most texel |
| w'$_{prop}$[k] | weighting factor for texels in this row which are outside the right-most and weighted texel |
| w'$_{text}$[l] | texel weighting = 0.0 to 1.0 |

Figure 7:
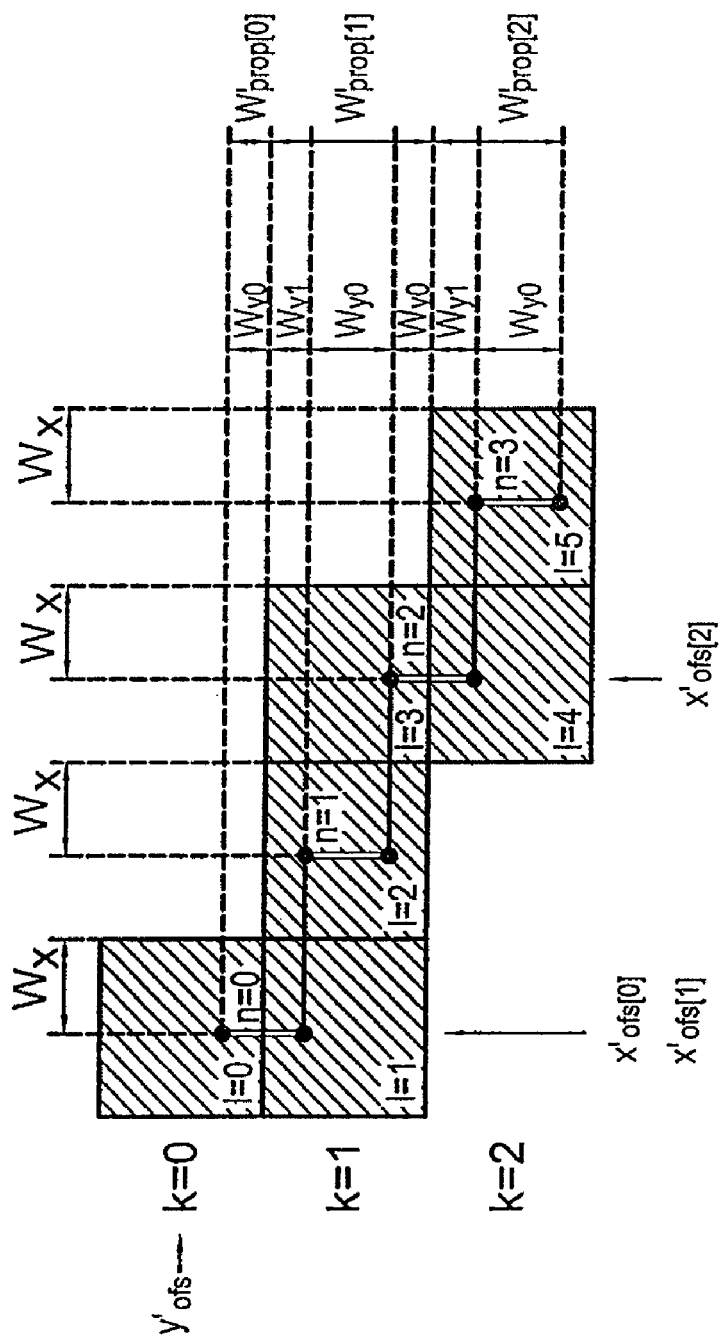
FIG. 7 is a representation of a shifted edge in a texel grid with the associated weighting table entries.

In FIG. 7 entries indicated in the above table are illustrated graphically. The highest possible value for k and l, in the preferred embodiment, depends on the maximum allowed edge extension $E_{max}$, so that the following applies:

k=0, . . . , $E_{max}$, and l=0, . . . , 2 $E_{max}$.

The following calculating rule applies for the step propagation:

$$p_i^* = \vartheta_i' \cdot \frac{1}{2} |q_{i,y}|$$

Figure 8:
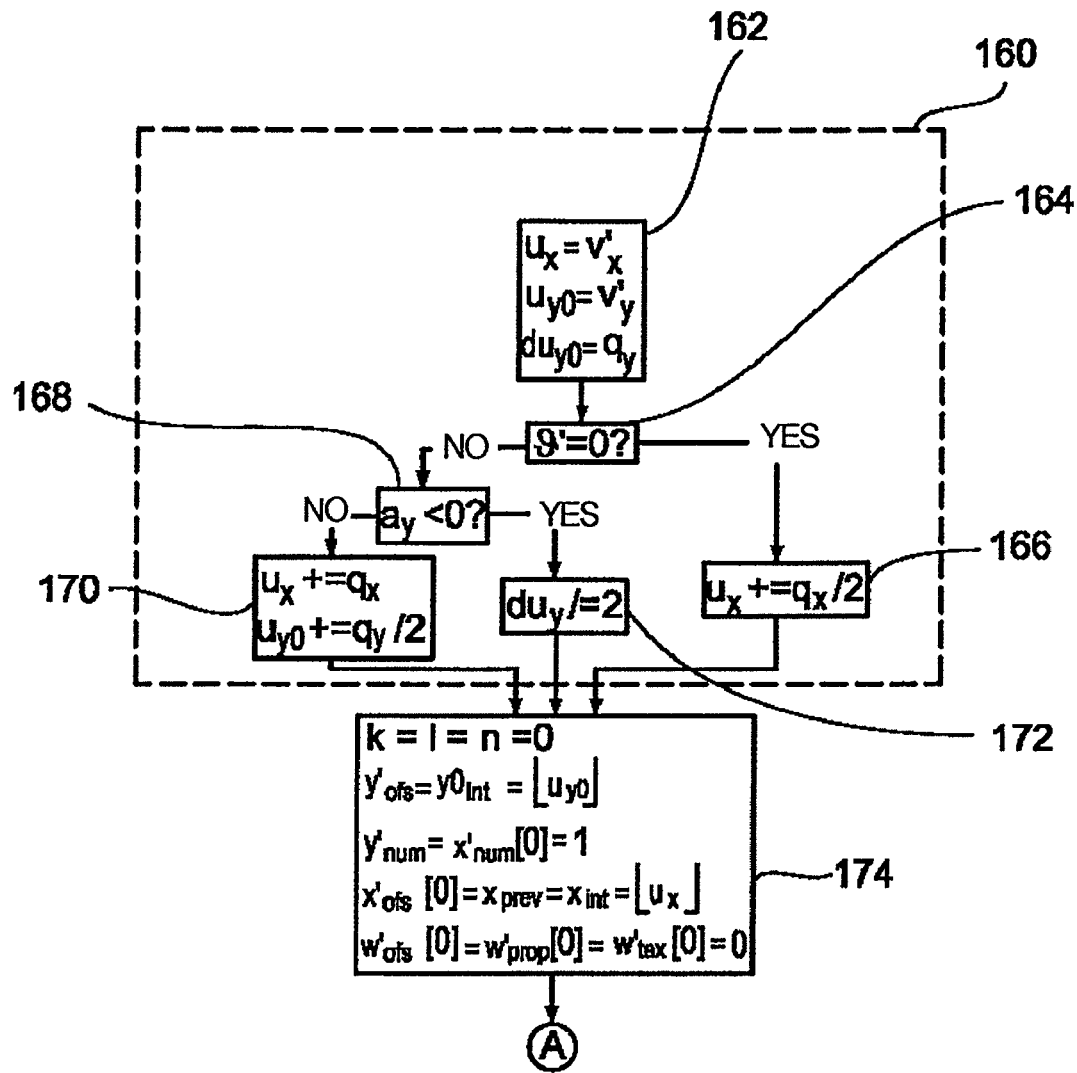
FIGS. 8A and B show a flow chart illustrating a method for processing a shifted edge according to an embodiment of the present invention.
Figure 8:
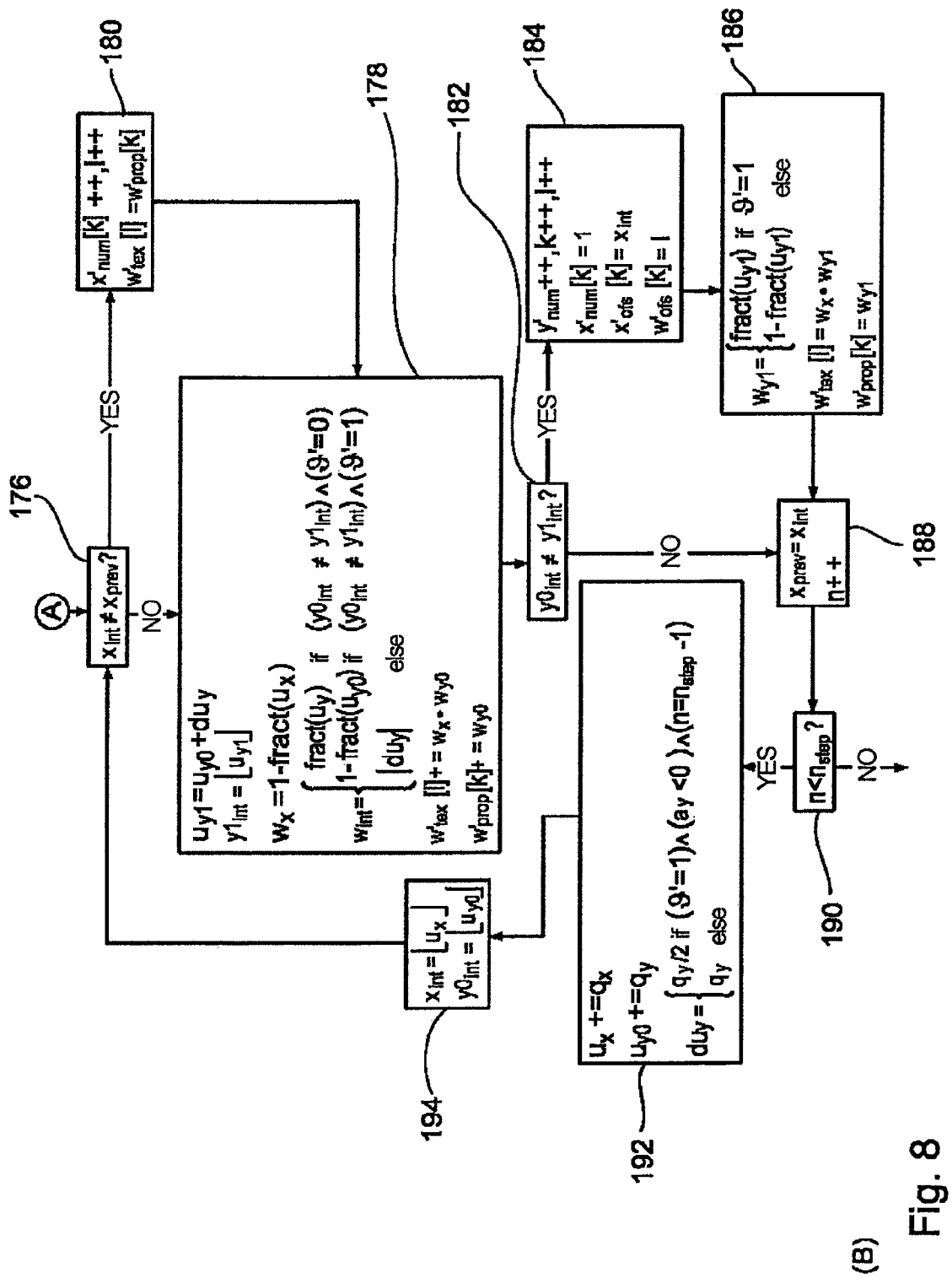

Referring to FIG. 8, a preferred embodiment of the slice processing loop mentioned above will be explained in greater detail.

As regards the following description of a slice processing loop in FIG. 8, it is to be noted that an explicit indication of the index i has been dispensed with since it would appear in all the values. Only the process for one edge will be described, wherein the method described referring to FIG. 8 is usually performed in parallel for all the edges. In FIG. 8, the index l is indicated which only counts the number of texels hit by its edge (see FIG. 7) for processing the slices.

Figure 9:
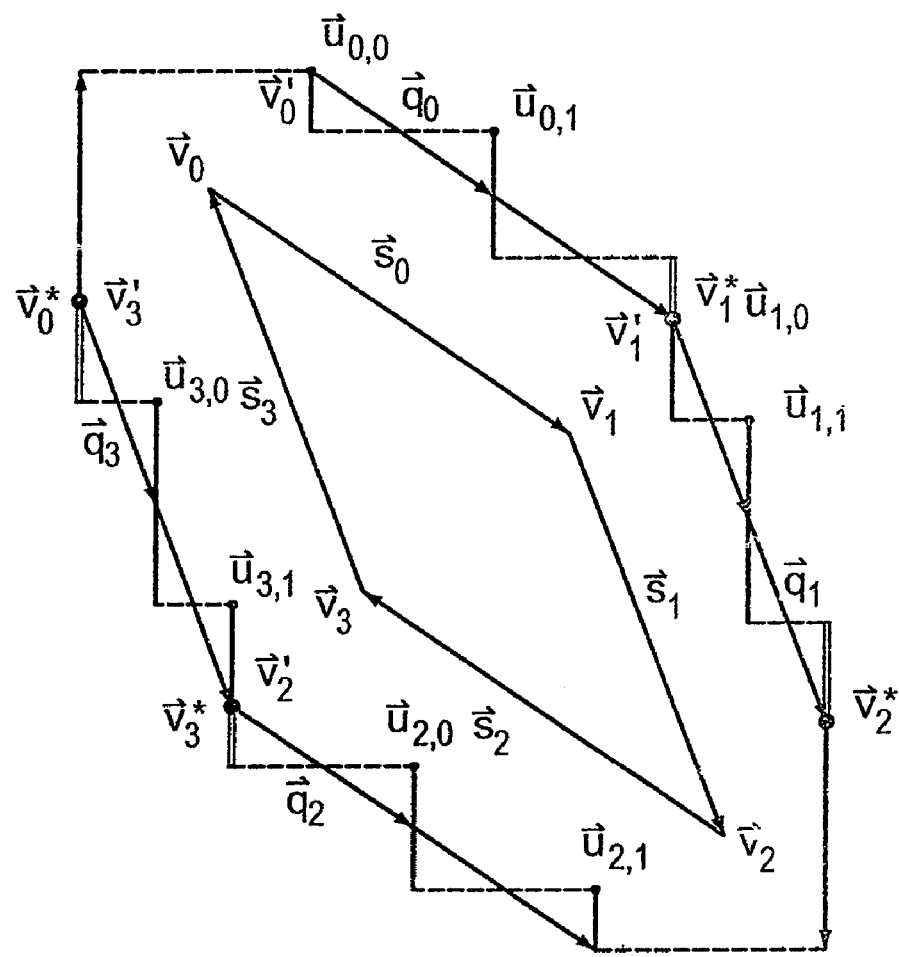
FIG. 9 is a representation of a footprint and of an enlarged footprint with the help of which the step propagation is described.

In an initial portion 160, the coordinates for the first slice are initialized, see the vectors $u_{i,0}$ in FIG. 9. In block 162, the coordinates of the starting point $u_x$, $u_{y0}$ and the height $du_y$ (see FIG. 10B) are determined, wherein the actual coordinates of the first slice depend on the beginning of the edge considered, which is indicated by the corresponding starting vertex v, and on the orientation of the edge, which is indicated by $\vartheta'$ or $a_y$. Thus, for determining the actual starting point, it is at first determined in block 164 whether there is a horizontal step orientation $\vartheta'$ or not for the point considered and determined in block 162. If the step orientation is horizontal, the method will proceed to block 166 in which the coordinate $u_x$ of the starting point is increased by the value $q_x/2$. The other coordinates or parameters determined in block 162 remain unchanged.

If the step orientation determined in block 164 is not a horizontal but a vertical orientation, the method will proceed to block 168 in which the orientation $a_y$ of the edge considered is determined at first. If the edge considered is a top edge, the process will proceed to block 170 in which the coordinate value $u_x$ is increased by the value $q_x$. The coordinate value $u_{y0}$ is also increased by the value $q_y/2$ in block 170.

If it is determined in block 168 that the edge considered is a bottom edge, the method will proceed to block 172 in which the height $du_y$ is halved.

The starting coordinates for the slice considered determined in this way are then provided to block 174. In block 174, the indices used are first initialized, wherein k counts the texel rows, l counts the texels in general and n counts the slices. The coordinate of the first texel row $y'_{ofs}$ corresponds to the texel below the slice starting point, wherein in the second row in block 174, regarding the starting coordinate value $u_{y0}$, the so-called floor function is indicated, which illustrates the next integer value in a direction $-\infty$ departing from the value indicated for $u_{y0}$.

The number of the rows concerned and the texels concerned when processing the slice is initialized in the first row from 1, as is indicated by $y'_{num}=x'_{num}[0]=1$. In addition, the x coordinate $x'_{ofs}$ of the beginning of the first row will equal the slice position $u_x$, wherein again the next integer value departing from $u_x$ in the direction $-\infty$ will be selected. In addition, the weighting information $w'_{ofs}$ for the first row and the first texel is initialized to a value 0.

Based on the values initialized in block 174, the method will proceed with block 176 in FIG. 8B. In block 176, an inspection is made as to how the x position considered at this time has changed due to later calculations. Departing from block 174, it is determined that the two parameters indicated in block 176 are equal so that the method in this case proceeds to block 178 in which the first texel is weighted. In block 178, the weightings for the first texel hit by the slice are determined, which is determined according to the calculating rules indicated in block 178. In block 178, at first the slice end point $u_{y1}$ and subsequently the appropriate integer texel coordinate $y1_{int}$ is calculated based on the next integer value of $u_{y1}$ in the direction of $-\infty$. Then, the texel fraction $w_x$ is calculated, resulting from the vertical section, as is illustrated in FIG. 7. In addition, the fraction $w_{y0}$ resulting from the horizontal section is calculated. The differentiation indicated takes into account which direction the slice has (see FIG. 10B) and whether one or two texels are hit.

Based on the information regarding the fraction of the horizontal and the vertical section determined in this way, the weighting contribution $w'_{tex}[l]$ of the slice to the current texel is determined in block 178 by increasing the existing value by the product of $w_x$ times $w_{y0}$. Finally, the weighting contribution $w'_{prop}$ passed on to the right texel is determined by increasing the existing value for $w'_{prop}$ by the value $w_{y0}$.

If it has been determined in block 176 that the x position has changed by a later calculation, that is a new texel in the same row is considered, the index l and the number of texels already processed in this row $x'_{num}$ are at first incremented. In addition, the weighting for the new texel $w'_{tex}[l]$ is set to $w'_{prop}[k]$ so that the weighting contributions of the previous texels are passed on.

The method then proceeds from block 180 to block 178 in which a corresponding weighting of the new texel is performed in the manner described above.

If the calculation of the weighting of one texel has been completed in block 178, the method will proceed to block 182 in which it is determined whether the end point of the slice is in another row than the starting point. If this is the case, the method will proceed to block 184 in which a new texel in a new row is determined, that is a process-jump to the next row to be considered is performed so that the row number $y'_{num}$ the row index k and the texel index l are incremented at first. In addition, the texel number $x'_{num}[k]$ is re-initialized to a value 1 and the coordinate of the first texel in the new row $x'_{osf}$ is determined. In addition, the index for the $w_{tex}$ array is determined in which the weight for the first texel of this row is stored.

The method proceeds from block 184 to block 186 in which the weighting for the second texel hit by the slice is calculated, similar to block 178, so that reference is made to the description there.

After block 186, the method proceeds to block 188 in which the x position of the slice just considered is stored and the index n is incremented in order to get to the next slice. In block 190, it is determined whether the value n is smaller than the value $n_{step}$ and, if this is not the case, it is determined that the last slice has been processed. In this case the method ends. If it is, however, determined that the last slice has not yet been processed, the method will proceed to block 192 in which the coordinates for the next slice are calculated. For this, the coordinate $u_x$ is increased by the value $q_x$ and the coordinate $u_{y0}$ is also increased by the value $q_y$. The differentiation in the consideration of $du_y$ takes the case shown in FIG. 9 with respect to the edges $s_2$ and $s_3$ into account, according to which the last slice only comprises half the length. In the edges $s_0$ and $s_1$, this is already the first slice, which has already been taken into account in the starting initialization in block 160.

Based on the data determined in block 192, the texel coordinates of the starting point are re-calculated in block 194 and a new weighting calculation run for this slice is then performed.

The vertex edge processing indicated in FIG. 1A in block 114 will be detailed subsequently, which treats the vertical edges having been added to fill the vertical gaps.

Fundamentally, the weighting tables for the vertex edges provide the same parameters as have been used for the offset edges. The implementation of these weighting tables is, however, less complicated since the number of possible rows is considerable lower and the indication of the weightings and rows do not differ since the orientation of the edges considered is always vertical.

The following table indicates the weighting for the vertex edges.

| | |
|---|---|
| $y^*_{ofs}$ | y integer coordinate of the texel row k = 0 |
| $x^*_{ofs}$ | x integer coordinate of the texel row k = 0 |
| $y^*_{num}$ | number of texel rows |
| $w^*_{tex}[k]$ | texel weighting in the range of 0.0 to 1.0 |
| $w^*_{prop}[k]$ | weightings for the texels in this row which are to the right of the weighted texel which is arranged in the right-most position |

Figure 10:
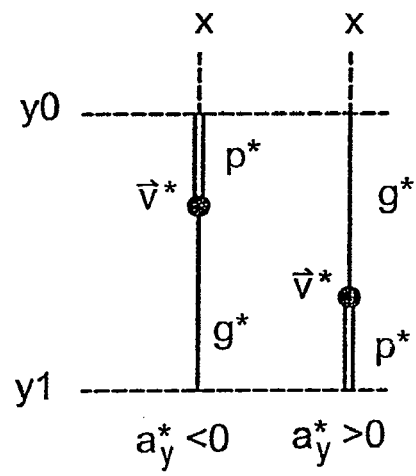
FIGS. 10A and B are illustrations for explaining the notation of a vertex edge and of a slice (vertical step element)
Figure 10:
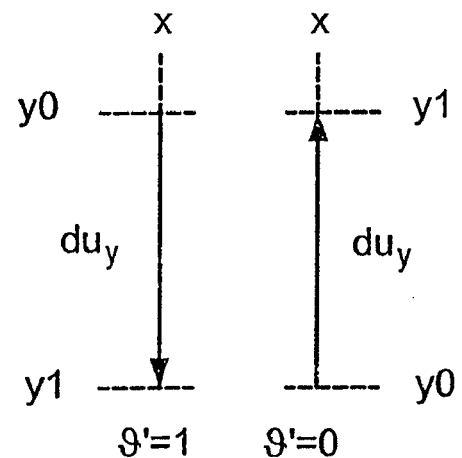

The enlargement gap g and the step propagation p are added to the total length of a vertex edge, as is illustrated in FIG. 10 so that the coordinates (starting point and end point) of a vertex edge result according to the following calculating rule:

$$(y0, y1) = \begin{cases} (v^*_{i,y} - p^*_i, v^*_{i,y} + g^*_i) & \text{if } a^*_{i,y} < 0 \\ (v^*_{i,y} - g^*_i, v^*_{i,y} + p^*_i) & \text{else} \end{cases}$$

$$x = v^*_{i,x}$$

The edge length is g+p=2·r+p, with a max value for r and p=0.5. A maximum length of 0.5·1.0+2·0.5=1.5 results from the above calculating rule, which limits the number of texel rows to 3. The table elements for k=0, 1, 2 for a vertex edge i are determined according to the following calculating rule:

$$y_{int} = y_{ofs}^* = \lfloor y \rfloor$$

$$y_{int}' = \lfloor y' \rfloor$$

$$x_{int} = x_{ofs}^* = \lfloor x \rfloor$$

$$y_{num}^* = y_{int}' - y_{int} + 1$$

$$w_{prop}^*[k] = \min(y_{int}+k+1, y') - \max(y_{int}+k, y)$$

$$w_{tex}^*[k] = w_{prop}^*[k] \cdot (x_{int}+1-x)$$

Figure 11:
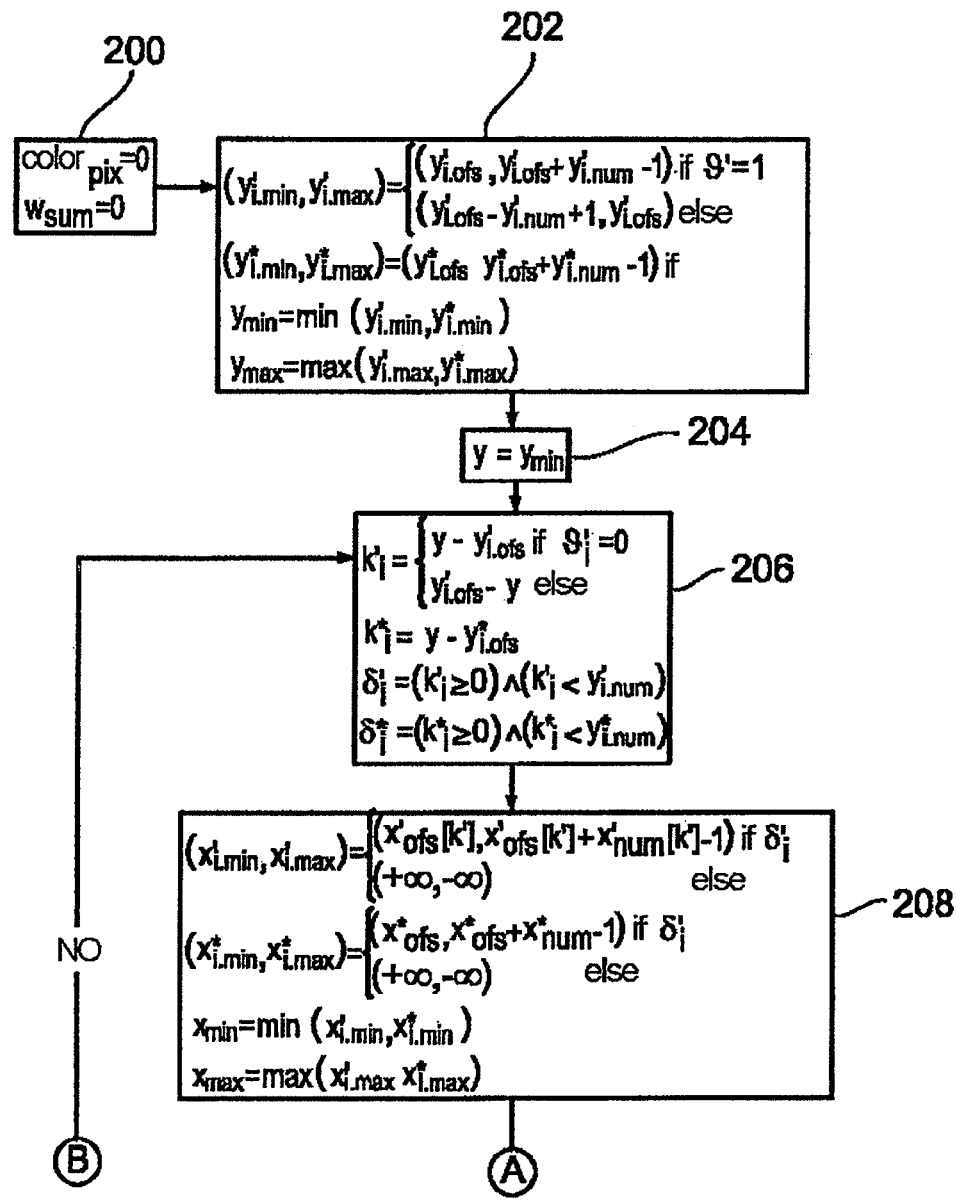
FIGS. 11A and B show a flow chart illustrating a method for calculating the color of a pixel.
Figure 11:
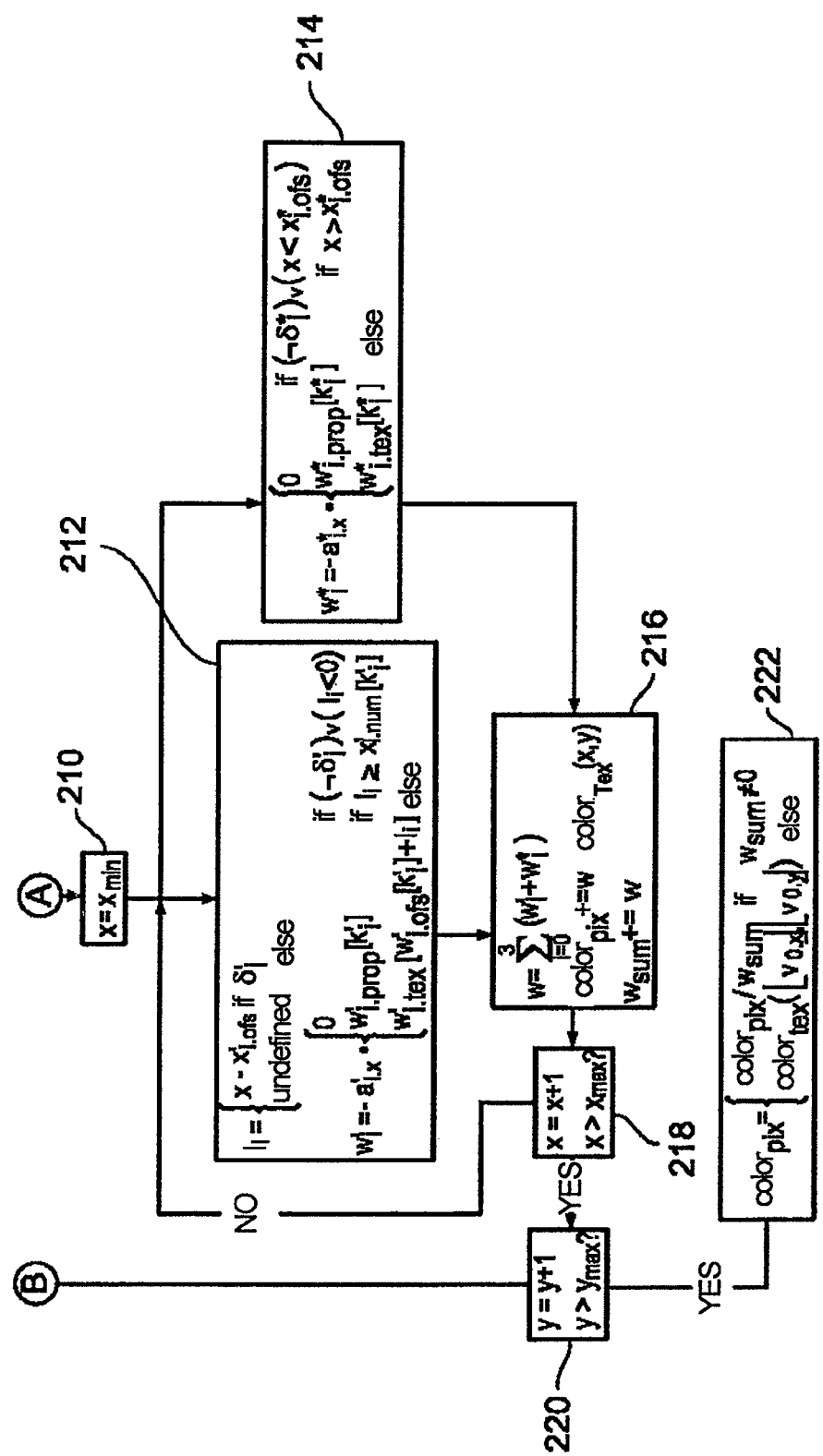

After all the weighting tables for the corresponding edges, that is the vertex edges and the offset edges, have been determined and provided according to FIG. 1B in blocks 116 and 118, the final color calculation according to block 120 in FIG. 1B can take place. Subsequently, an example of the last remaining process step from FIG. 1, that is block 120, will be discussed in greater detail. This color calculation mainly consists of a loop which assesses the data structures which have been produced and stored in the manner described above for each offset edge and each vertical edge. More explicitly, in this color calculation reference is made to all the texels contacted or covered by the enlarged footprint, for each of these texels a weighting is determined. For a texel (x, y), the weighting factor w Σ [0, 0, 1.0] is calculated to the sum of all the edge contributions read out from the weighting tables. The process for calculating the pixel color resulting depends, in detail, on the region surrounding the pixel, such as, for example, on the organization of the access to the texture memory. A functional example for the color calculating procedure will be explained in greater detail subsequently referring to FIG. 11, wherein the procedure illustrated in FIG. 11 is a loop which is passed several times to process all the texels concerned. Regarding FIG. 11, it is to be pointed out that the index i describes the parallelism of the calculations indicated for four edges. Equations in which i appears on both sides of the equal sign describe four equations, one for each edge (i=0, 1, 2, 3). i indicated values as the function argument describe four arguments. The index l indicates the texels hit by an edge within a row.

In FIG. 11A, in block 200 all the color components and the sum of all the texel weights are at first initialized to 0. The color components are generally RGB components and the α component, wherein the equations show a calculation for only an abstract component $color_{pix}$. After the initialization of the color components and the sum of all the texel weights, a bottom-most and a top-most texel row are determined in block 202, wherein the smallest and the largest y coordinate of all the texels described by the values in the two tables described above must be calculated. At first, a minimum and a maximum value of one respective edge ($y'_{i,min}$ and $y'_{i,max}$) are determined from the table indicated above regarding the offset edges. By the equation indicated, eight equations are described, that is for the determination of $y_{min}$ and $y_{max}$ for respective four edges. The differentiation indicated in the allocation takes into account whether the table has been set up in the direction of increasing or decreasing y coordinates.

In addition, the minimum and the maximum values of an edge $y^*_{i,min}$ and $y^*_{i,max}$ are determined in block 202 based on the table indicated above for the vertex edge processing. Afterwards eight minimum values $y_{min}$ are determined from the minimum values determined for the vertex edges and the offset edges and eight maximum values $y_{max}$ are determined from the determined maximum values for the offset edges and the vertex edges. After the determination of the bottom-most and the top-most texel row has been performed in this way, the method will proceed to block 204 in which the loop value y describing a texel row is initialized to the value $y_{min}$. The loop is passed for y values from $y_{min}$ to $y_{max}$.

Subsequently, the values indicated in the tables described above are used in block 206 to compensate the offset contained therein. Thus, the loop parameter $k'_i$ applying to the offset edges is determined at first. The values of the corresponding table contain only values for $x_{num}$ rows, beginning with the integer y coordinate of the texel row 0 ($y_{ofs}$). This offset is subtracted from the loop value to obtain the row index $k'_i$ within the table for the offset edges. Similarly, as has been described above regarding block 202, it has to be taken into account whether the underlying table contains the y coordinate in an increasing or decreasing order.

Subsequently, a corresponding removal of the offset for the values from the vertex edge table takes place to obtain the row index $k^*_i$ in this way. In addition, the values of the flags $\Delta'_i$ and $\Delta^*_i$ indicating whether an edge considered is above the current y, that is will provide a contribution to the texel weights, are determined.

Afterwards, the left-most and the right-most texel in the row considered are determined in block 208. For the current row, the smallest and the largest x coordinate of all the texels are now determined, which are weighted by the tables, that is the x coordinates $x'_{i,min}$ and $x'_{i,max}$ for the offset edges and the coordinates $x^*_{i,min}$ and $x^*_{i,max}$ for the vertex edges. Edges not providing a contribution, that is for which the flags $\Delta^*_i$ or $\Delta'_i$ determined in block 206 are 0, are not taken into account in the corresponding determination of the minimal and maximal x values, which is formally described by the ±∞ contributions.

The minimum value $x_{min}$ is then selected from the minimum x coordinates determined for the offset edges and the vertex edges. The maximum value $x_{max}$ is also selected from the maximum x coordinates determined for the offset edges and the vertex edges. Subsequently, the method proceeds to block 210 (FIG. 11B). In block 210, the loop value x indicating a texel within the row considered is initialized to the value $x_{min}$. This loop value runs from $x_{min}$ to $x_{max}$. Subsequently, the method proceeds to block 212 in which the weighting contributions for the offset edges are read out from the tables provided. Here, the contributions of all the eight edges are determined for weighting the texel at the coordinates x, y.

At first, the index $l_i$ of the texel within the row for a corresponding edge is considered (see FIG. 7). Afterwards, the weighting contribution $w'_i$ for the offset edge is considered, wherein four cases for each edge must be differentiated. The texel can either be above or below the edge, wherein in this case the value $\Delta'_i$ is 0 so that the concerning texel does not provide a contribution. In addition, the texel can be left of the edge, wherein in this case the index l is smaller than 0 and in this case no contribution of the texel is provided to the overall weighting. If the texel is, however, right of the edge, that is $l \geq x_{num}$, the value $w'_{prop}$ provided in the corresponding table is selected. If the texel is on the edge, the value $w'_{tex}$ provided in the table is provided. The factor $a'_{i,x}$ negates the result for right edges.

In parallel to block 212, a corresponding read out of the tables regarding the weighting contribution of the vertex edges is performed in block 214, wherein the corresponding contribution $w^*_i$ is also determined. Like in block 212, four cases must be differentiated. In the first case, the texel is above or below the edge, the corresponding value $\Delta^*_i$ is thus 0. In this case, the texel does not provide a contribution for the overall weighting. If the texel is left of the edge, it will not contribute to the weighting either. If the texel is to the right of the edge, $x > x^*_{i,ofs}$, the value $w^*_{prop}$ determined in the table regarding the vertex edges will be selected. If the texel is on the edge, the corresponding value $w^*_{tex}$ will be selected. In this case, the result for right edges is also negated by means of the factor $a^*_{i,x}$.

After the respective contributions for the offset edges and the vertex edges to weighting have been determined in blocks 212 and 214, the method proceeds to block 216 in which all the contributions are summed and the texel color is weighted. At first, the eight contributions calculated in blocks 212 and 214 are summed up to obtain the summed weighting value w. The weighting value w obtained in this way is then multiplied by the color components $color_{tex(x,y)}$ of the texel and added to the color of the pixel $color_{pix}$. For a later normalization of the color, the overall sum $w_{sum}$ of the texel weightings is performed. More explicitly, the value $w_{sum}$ is increased by the value w determined in block 216.

Finally, the method proceeds to block 218 wherein, on the one hand, the loop value x is incremented by 1 and, on the other hand, it is determined whether the value x exceeds the maximum value $x_{max}$. If this is not the case, there are still texels to be processed in the considered row and the method, from block 218, goes back to blocks 212 and 214. There is consequently a jump by one texel to the right and a corresponding revision concerning this texel is performed. If it is determined in block 218 that all the texels of a row have been processed, the method will proceed to block 220 in which the loop value y is incremented by 1 and it is examined where the loop value y exceeds the maximum y value $y_{max}$. If this is not the case, a jump to the next row is performed and the method goes back to block 206. If it is determined that the last texel row has been processed, the method proceeds from block 220 to block 222. In block 222, the actual color of the pixel $color_{pix}$ is determined, wherein for the case that a weighting exists, that is $w_{sum}$ is unequal to 0, indicating that at least a texel has been contacted by the considered edge, the color pixel value is normalized based on the summed weighting $w_{sum}$, that is $color_{pix/sum}$ is determined. In a so-called 0 weighting, that is when the footprint degenerates to a point and has an enlargement offset has a value of 0, the color of the texel under the vertex 0 of the footprint is taken over unchanged (next filter). This means that the texel closest to the point coordinates is selected and is associated a constant weighting of 1.0.

Although the present invention, in the above description of the preferred embodiments, has been described on the basis of a footprint having four sides, the inventive approach can generally be extended to any footprint.

Further, it is to be pointed out that the present invention is not limited to the above embodiments in which an initial enlargement of the footprint has been performed. If such an enlargement is not desired, if, for example, no enlargement offset is associated with the receiving footprint, the inventive method operates regarding the original footprint and results in an accelerated processing of it due to the inventive steps for finding texels below edges.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for displaying an image of an object on a display device, the image comprising at least one pixel, the method comprising:
   determining weighting factors for the color calculation of a color value of texels for a footprint covering a plurality of texels in a texel grid, wherein the footprint is a projection of the object, and wherein determining the weighting factors comprises:
   (a) determining form information of the footprint;
   (b) determining edges of the footprint;
   (c) approximating the edges determined in step (b) by a staircase function;
   (d) determining the texels of the texel grid contacted by the staircase function; and
   (e) determining a weighting factor for each texel containing a portion of the staircase function depending on a subarea of the respective texel covered by the footprint; and
   displaying an image of said object on said display device wherein said image include the determined texel color values.

2. The method according to claim 1, wherein in step (d) a texel contacted by the staircase function is determined based on the starting points and/or end points of the vertical portions of the staircase function.

3. The method according to claim 1, wherein in step (e) a uniform weighting value is associated with the texels of the texel grid not contacted by the staircase function and covered by the footprint.

4. The method according to claim 1, wherein in step (e) the weighting factor for each texel is associated with a data structure.

5. The method according to claim 1, wherein the staircase function for each edge of the footprint includes a plurality of steps, a plurality of horizontal step elements and a plurality of vertical step elements,
   wherein each edge includes a plurality of subsequent edge portions of equal length,
   wherein a horizontal edge is present when the end points of the edge portions of the edge intersect a horizontal step element of the staircase function, wherein a vertical edge is present when the end points of the edge portions of the edge intersect a vertical step element of the staircase function, wherein a horizontal edge includes a number of vertical step elements, the number being equal to the number of steps of the staircase function, wherein a vertical edge includes a number of vertical step elements, the number being larger than the number of the steps of the staircase function by an additional vertical step element, and wherein the additional vertical step element is used for calculating the weighting factors of a neighboring edge having the same vertical position.

6. The method according to claim 1, wherein determining the subarea of the texel, following step (e), includes determining the texel subarea determined by the staircase function and covered by the footprint.

7. The method according to claim 6, wherein the weighting factor determined in step (e) is determined by the ratio of the texel subarea to the texel overall area.

8. The method according to claim 1, wherein an enlargement offset (r) is associated with the footprint, wherein following step (a), based on the enlargement offset, the footprint is enlarged by offsetting the edges of the footprint outwardly from the current edge footprint positions by a distance depending on the enlargement offset, wherein the offset edges are determined in step (b), wherein the offset edges are approximated in step (c) by a staircase function, and wherein in step (e) a weighting factor for each texel containing an offset edge is determined depending on the subarea of the respective texel covered by the enlarged footprint.

9. The method according to claim 8, wherein gaps resulting due to the enlargement of the footprint are filled by horizontal and vertical edges.

10. The method according to claim 9, wherein in step (e) the weighting factor for each texel containing an incorporated vertical edge is determined depending on a subarea of the respective texel covered by the enlarged footprint.

11. The method according to claim 8, wherein enlarging the footprint includes offsetting the edge end points in the horizontal direction and the vertical direction by the same distances determined by the enlargement offset.

12. The method according to claim 1, wherein the weighting factors for all the edges of the footprint are produced in parallel.

13. A method for displaying an image of an object on a display device, the image comprising at least one pixel, the method comprising:

determining weighting factors for the color calculation of a color value of texels for a footprint covering a plurality of texels in a texel grid, wherein the footprint is a projection of the object, and wherein determining the weighting factors comprises:

(a) determining form information of the footprint;

(b) determining edges of the footprint;

(c) approximating the edges determined in step (b) by a staircase function;

(d) determining the texels of the texel grid contacted by the staircase function;

(e) determining a weighting factor for each texel containing a portion of the staircase function depending on a subarea of the respective texel covered by the footprint;

wherein an enlargement offset (r) is associated with the footprint, wherein following step (a), based on the enlargement offset, the footprint is enlarged by offsetting the edges of the footprint to the outside outwardly from the current edge footprints positions by a distance depending on the enlargement offset, wherein the offset edges are determined in step (b), wherein the offset edges are approximated in step (c) by a staircase function, and wherein in step (e) a weighting factor for each texel containing an offset edge is determined depending on the subarea of the respective texel covered by the enlarged footprint; and displaying an image of said object on said display device wherein said image include the determined texel color values.

14. A method for displaying an image of an object on a display device, the image comprising at least one pixel, the method comprising:

determining weighting factors for the color calculation of a color value of texels for a footprint covering a plurality of texels in a texel grid, wherein the footprint is a projection of the object, and wherein determining the weighting factors comprises:

(a) determining form information of the footprint, wherein an enlargement offset (r) is associated with the footprint;

(b) determining edges of the footprint;

(c) approximating the edges determined in step (b) by a staircase function;

(d) determining the texels of the texel grid contacted by the staircase function; and (e) determining a weighting factor for each texel containing a portion of the staircase function depending on a subarea of the respective texel covered by the footprint, wherein following step (a), based on the enlargement offset, the footprint is enlarged by offsetting the edges of the footprint outwardly from the current edge footprint positions by a distance depending on the enlargement offset, wherein the offset edges are determined in step (b), wherein the offset edges are approximated in step (c) by a staircase function, and wherein in step (e) a weighting factor for each texel containing an offset edge is determined depending on the subarea of the respective texel covered by the enlarged footprint; and displaying an image of said object on said display device wherein said image include the determined texel color values.

15. The method according to claim 14, wherein gaps resulting due to the enlargement of the footprint are filled by horizontal and vertical edges.

16. The method according to claim 15, wherein in step (e) a weighting factor for each texel containing an incorporated vertical edge is determined depending on a subarea of the respective texel covered by the enlarged footprint.

17. The method according to claim 14, wherein enlarging the footprint includes offsetting the edge end points in the horizontal direction and the vertical direction by the same distances determined by the enlargement offset.

* * * * *